United States Patent
Bhogal et al.

(10) Patent No.: US 7,515,101 B1
(45) Date of Patent: Apr. 7, 2009

(54) METHOD AND SYSTEM TO ALERT USER OF LOCAL LAW VIA THE GLOBAL POSITIONING SYSTEM (GPS)

(75) Inventors: Kulvir S. Bhogal, Pflugerville, TX (US); Robert R. Peterson, Austin, TX (US); Lisa A. Seacat, San Francisco, CA (US); Mark W. Talbot, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/134,869

(22) Filed: Jun. 6, 2008

(51) Int. Cl.
*G01S 1/00* (2006.01)
(52) U.S. Cl. .............................. 342/357.06; 342/357.07
(58) Field of Classification Search ............ 342/357.06, 342/357.07, 357.13, 357.17, 451, 457; 701/208, 701/209, 213; 455/456.1, 456.2, 565, 569.2
See application file for complete search history.

(56) References Cited

U.S. PATENT DOCUMENTS

| | | | |
|---|---|---|---|
| 6,265,989 B1 * | 7/2001 | Taylor | 340/901 |
| 6,496,703 B1 * | 12/2002 | da Silva | 455/456.4 |
| 6,501,421 B1 | 12/2002 | Dutta et al. | |
| 6,973,333 B1 * | 12/2005 | O'Neil | 455/569.2 |
| 2002/0128000 A1 * | 9/2002 | do Nascimento, Jr. | 455/414 |
| 2003/0064731 A1 * | 4/2003 | Angelo et al. | 455/456 |
| 2004/0102898 A1 | 5/2004 | Yokota et al. | |
| 2007/0072616 A1 * | 3/2007 | Irani | 455/441 |
| 2008/0099563 A1 * | 5/2008 | Wormald et al. | 235/472.01 |

* cited by examiner

*Primary Examiner*—Dao L Phan
(74) *Attorney, Agent, or Firm*—Leveque IP Law, P.C.

(57) ABSTRACT

A method and system provides for notification to a user of registered devices that are in violation of local law using the Global Positioning System (GPS). One or more one or more devices in a mobile environment are registered with a GPS navigation system of the mobile environment. In response to the mobile environment moving from a first location to a second location, the GPS navigation system retrieves local law information that specifies or defines local law of the second location using GPS coordinates of the second location. It is next determined whether each device of the one or more devices registered with the GPS navigation system is in violation of the local law. If so, a user in the mobile environment is notified of each registered device that is in violation of the local law.

1 Claim, 2 Drawing Sheets

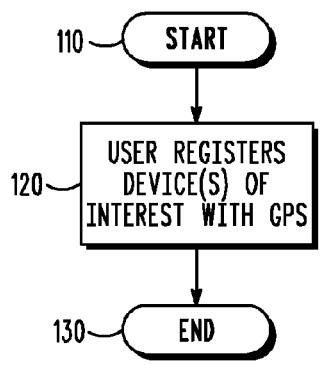
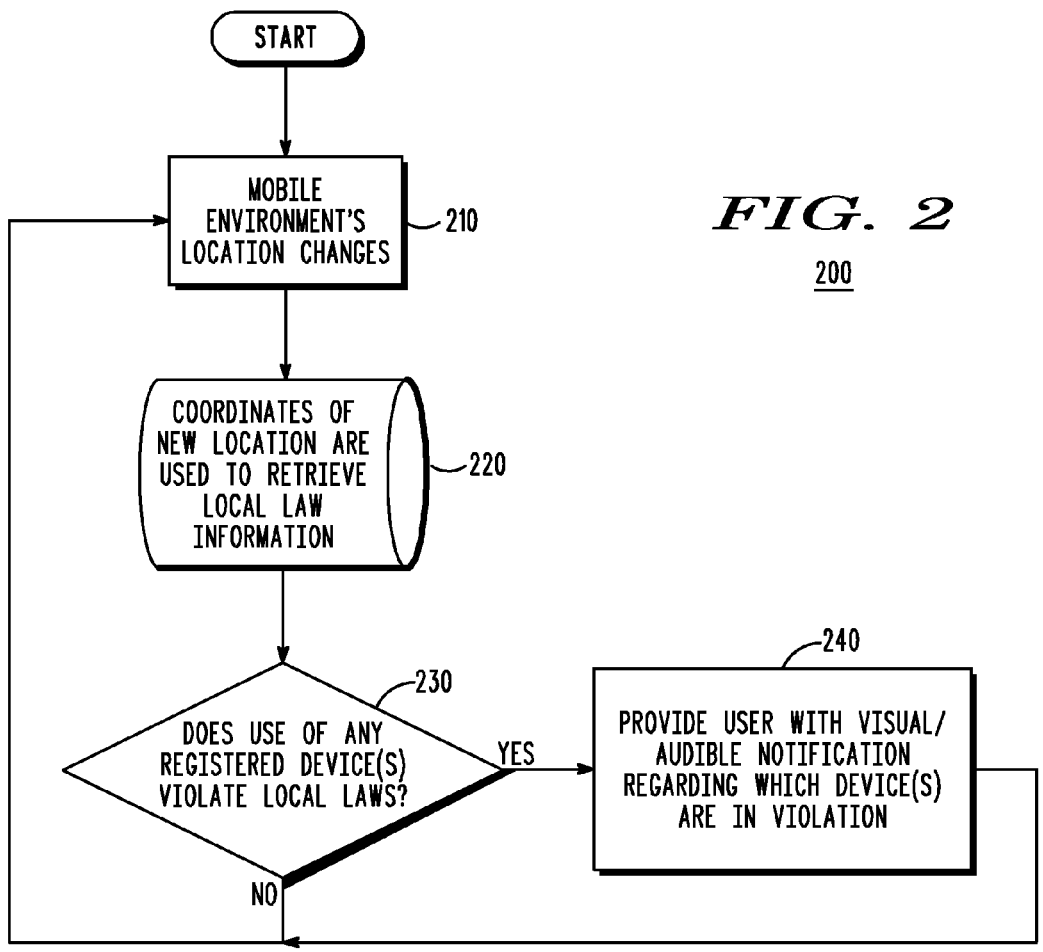

METHOD AND SYSTEM TO ALERT USER OF LOCAL LAW VIA THE GLOBAL POSITIONING SYSTEM (GPS)

CROSS-REFERENCE TO RELATED APPLICATIONS

The present is related to Ser. No. 12/134,892, METHOD AND SYSTEM TO CONTROL OPERATION OF REGISTERED DEVICES IN RESPONSE TO LOCAL LAW VIA THE GLOBAL POSITIONING SYSTEM (GPS) filed on even date herewith.

BACKGROUND

Laws and regulations governing usage of personal devices, such as radar detectors, cellular telephones, DVD players, etc. in cars, planes, buses, trains, and other examples of mobile environments can and often do vary by jurisdiction. What is legal usage in one state, municipality or other jurisdiction might be illegal in another. For example, in Virginia and the District of Columbia, two neighboring jurisdictions, radar detectors are illegal to use, while in Maryland, which borders both the District of Columbia and Virginia, they are not. A person using a radar detector legally in Maryland would be in violation of local law once he crosses into either Virginia or the District of Columbia. Also, in some states, it is illegal to talk on a cellular telephone. Again, consider the case of neighboring states Virginia, Maryland and the District of Columbia. It is illegal to talk on the cellular telephone in the District of Columbia while driving but not in Maryland or Virginia. What is needed in the art is a way to notify a device user of local laws and regulations pertinent to device usage as the user travels from jurisdiction to jurisdiction.

BRIEF SUMMARY

In accordance with embodiments consistent with the present invention, a method and system provides for notification to a user of registered devices that are in violation of local law using the Global Positioning System (GPS). One or more devices in a mobile environment are registered with a GPS navigation system of the mobile environment. In response to the mobile environment moving from a first location to a second location, the GPS navigation system retrieves local law information that specifies or defines local law of the second location using GPS coordinates of the second location. It is next determined whether each device of the one or more devices registered with the GPS navigation system is in violation of the local law. If so, a user in the mobile environment is notified of each registered device that is in violation of the local law.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

FIG. 1 is a flowchart that illustrates an exemplary flow of device registration of one or more devices, in accordance with various embodiments disclosed herein.

FIG. 2 is a flowchart that illustrates an exemplary flow of runtime operation and registration of a GPS navigation system and one or more registered devices, in accordance with various embodiments disclosed herein.

DETAILED DESCRIPTION

Figure 3:
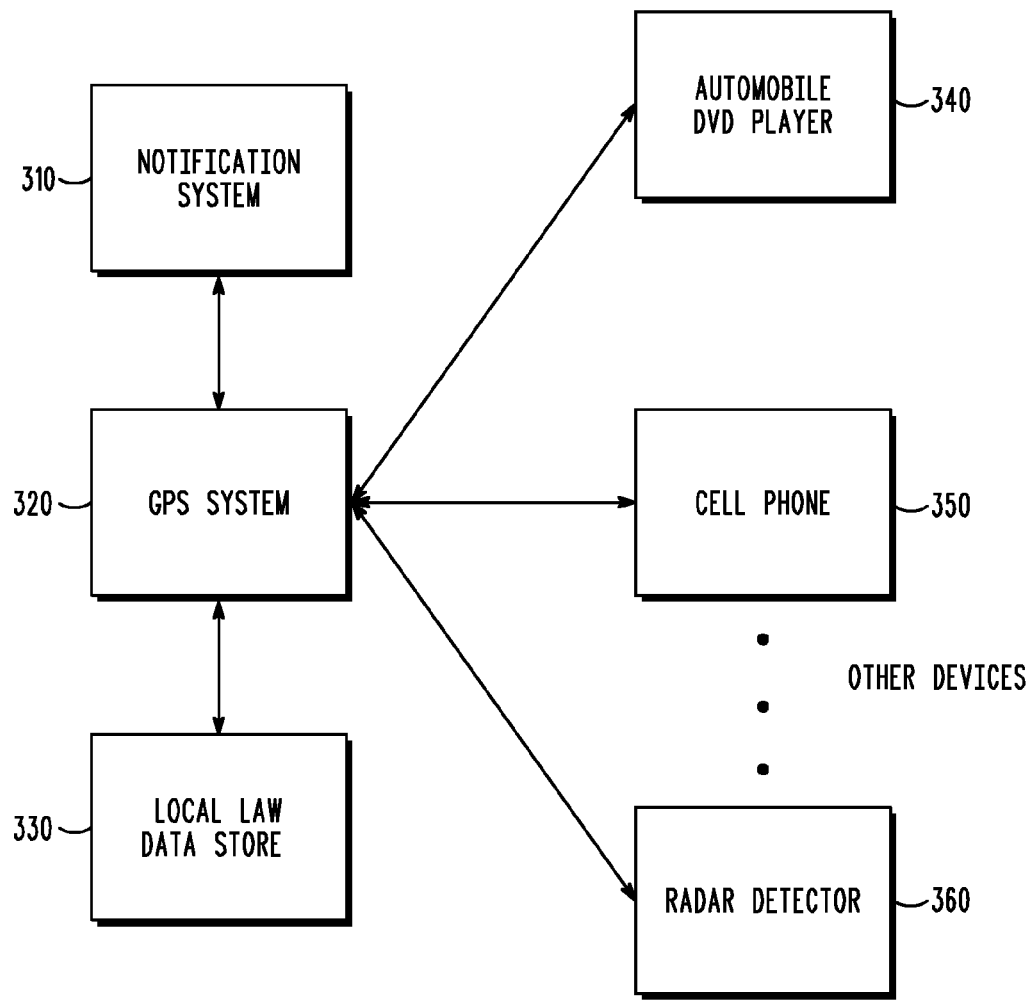
FIG. 3 is a functional block diagram of a system, in accordance with various embodiments disclosed herein.

In accordance with embodiments consistent with the present invention, a method and apparatus provides for providing notification of registered devices in violation of local law using the Global Positioning System (GPS). One or more devices, suitable for use in a mobile environment having a GPS navigation system or device, hereinafter referred to as a GPS navigation system or GPS system, are registered with the GPS system. A mobile environment may be provided by an automobile, a bus, a train, an airplane, etc. Examples of devices for use in a mobile environment may include cellular telephones, radar detectors, automobile DVD players, etc. These devices are capable of being in communication with the GPS navigation system and communication may be effected by either wireless or wired means. For example, such devices may be Bluetooth ready or enabled, although this is not required. In response to the mobile environment moving from a first location to a second location, the GPS navigation system retrieves local law information that specifies or defines local law or laws of the second location using GPS coordinates of the second location. It must be determined whether each device of the one or more devices registered with the GPS navigation system is in violation of the local law. For each device found to be in violation of local law, a user in the mobile environment, such as a driver, passenger, etc., is notified of the violation of that device.

Referring now to FIG. 1, a flow 100 of device registration is shown. At block 120, a user registers one or more devices of interest in the mobile environment with the GPS navigation system. For example, a user in an automobile may choose to register a cellular telephone, a radar detector, and an automobile installed DVD player, having screens in both the front viewable to the driver and the rear viewable to rear seat passengers. Registration of the devices with the GPS system allows the GPS navigation system to know which devices are contained in the mobile environment. It is noted that in an embodiment in which Bluetooth enabled devices are being used, sensors located throughout the cabin of the mobile environment, for example, may be used to let the GPS navigation system know which devices are present and operational.

For each device registered, the GPS navigation system stores a hierarchical list of jurisdictional locations in which use of the device is outlawed, illegal, restricted, or otherwise abridged; this may be part of the registration and synchronization procedure of Block 120. This so-called hierarchical "black list", lists in a hierarchical arrangement laws or rules governing use of a device by jurisdiction. Thus a hierarchy of jurisdictions might be Country=>State=>County=>City=>Precinct. For example, in Virginia radar detectors are currently illegal but not illegal in Maryland, a neighboring jurisdiction. So, Virginia would be in a radar detector black list. Having this hierarchical black list negates the need to list every city in Virginia in the radar detector black list. Local law information stored in the hierarchical list may be traffic laws, such as no right turn on red, or related directly to device usage in the jurisdiction. The GPS navigation system may alert a user of both types of local law.

As used herein the term registration also comprises user selection of a device from a list of available devices provided by the GPS navigation system. Such might be the case where the device itself is not equipped to communicate directly with the GPS navigation system to effect registration of the device with the GPS system. The user would be able to choose from a pre-defined list of devices, such as DVD players, cellular telephones, radar detectors, etc. presented to the user, and in making a selection, "register" their device with the GPS navigation system. This allows the GPS system to still know which devices are in the mobile environment and thus notification of when the device is in violation of a local law can still be effected in accordance with the various embodiments of the present invention.

After registration of one or more user devices with the GPS navigation system, run-time registration and operation is illustrated by flow 200 of FIG. 2. At Block 210, the location of the mobile environment changes from a first to a second (new) location. It must be determined whether the new location reflects a new jurisdiction possibly having new traffic laws or the like. At Block 220, the coordinates of the new location are used by the GPS navigation system to retrieve local law information that specifies or defines local laws, such as local traffic laws, associated with the new location. At Decision Block 230, the inquiry is whether use of any of the registered device(s) violates the local laws associated with the new location in order to determine whether each registered device is in violation of local law specified in the retrieved local law information. If any of the registered devices are determined to be in violation, then at Block 240, the GPS navigation system provides a user in the mobile environment with notification regarding which device(s) are in violation of the local laws. The user could be a driver, passenger, or a user of a registered user device(s). The notification provided to the user could be a visual notification, such as a message displayed on a display screen of the GPS system, and/or an audible spoken notification. Examples of such notifications include, by way of example and not limitation, the following:

"Please turn off your cell phone. It is illegal to use it while driving in X."

"Please turn off your radar detector. It is illegal to use it while driving in Y." Or the notification could be an instruction to change a function of a device, such as:

"Please disable the front seat display of your DVD player. It is illegal to watch it while driving in Z."

These notifications could be provided to the user visually or audibly.

These notifications/instructions are all examples that, if heeded by a user in the mobile environment, will ensure compliance with local laws dealing with the registered devices. While it is envisioned that such notification, instruction or alert is provided through a user interface (screen, display, speaker, etc.) of the GPS navigation system this is not required. Alternately, the GPS navigation system could transmit one or more control signals to other devices within the mobile environment that would, upon receipt of the one or more control signals, notify a user through a user interface of the device. For example, the GPS navigation system could send a control signal to the device itself in violation and cause it to notify the user of the location law violation, such as by displaying the message on the screen of the device itself or by having the device itself speak the notification audibly to the user.

Referring now to functional block diagram 300 of FIG. 3, it can be seen that GPS navigation system 320 is in cooperative communication with notification system 310, local law data store 330 and various user devices 340, 350, 360, illustrated here as an automobile DVD player, a cellular telephone, and a radar detector, respectively. As previously discussed, this functional block diagram 300 provides notification to users of registered devices that are in violation of local law using the GPS navigation system 320. Each device 340, 350, 360 registers with the GPS system and in so doing, provides the GPS system 320 information that it is in the mobile environment as well as providing access to allow the GPS system 320 to communicate with and even to potentially control the device 340, 350, 360. In response to the mobile environment moving from a first location to a second location, the GPS navigation system 320 retrieves local law information that specifies or defines local law of the second location using GPS coordinates of the second location. This is retrieved, for example, from local law data store or database 330. The local law information may be pre-stored on the GPS navigation system 320 or it may be downloaded from the Internet, for example, as needed. Processing capability of the GPS navigation system is able to determine whether each device of the one or more devices registered with the GPS navigation system is in violation of the local law. If so, it notifies a user in the mobile environment of each registered device that is in violation of the local law.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for providing notification of registered devices in violation of local law using the Global Positioning System (GPS), comprising:

registering a plurality of devices differing functionalities in a mobile environment with a GPS navigation system of the mobile environment;

the GPS navigation system storing for each registered device of the plurality of devices a hierarchical list of jurisdictional locations in which use of the device is not allowed;

in response to the mobile environment moving from a first location to a second location, the GPS navigation system retrieving local law information that defines local law of the second location using GPS coordinates of the second location; and determining whether each device of the a plurality of devices registered with the GPS navigation system is in violation of the local law and if so further comprising notifying a user in the mobile environment of each device of the a plurality of devices registered that is in violation of the local law.

* * * * *